United States Patent
Satoh et al.

(10) Patent No.: US 6,456,277 B1
(45) Date of Patent: Sep. 24, 2002

(54) DATA CONVERSION METHOD USED BETWEEN DIFFERENT TYPES OF KEYBOARDS

(75) Inventors: Yoshikazu Satoh, Yokohama; Katsuhiro Shimizu, Machida, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/518,005

(22) Filed: Mar. 2, 2000

(30) Foreign Application Priority Data

Mar. 2, 1999 (JP) .......................................... 11-054043

(51) Int. Cl.[7] ................................................. C09G 5/00
(52) U.S. Cl. ......................... 345/168; 345/171; 400/485
(58) Field of Search ................................. 345/156, 158, 345/168, 169, 170, 171, 172, 162, 173; 341/22, 23; 400/485, 486

(56) References Cited

U.S. PATENT DOCUMENTS

| | | | | |
|---|---|---|---|---|
| 5,402,121 A | * | 3/1995 | Noorbehesht | 341/26 |
| 5,631,643 A | * | 5/1997 | Hisamori et al. | 341/23 |
| 6,326,953 B1 | * | 12/2001 | Wana | 345/168 |

FOREIGN PATENT DOCUMENTS

| | | | | |
|---|---|---|---|---|
| JP | 61246826 | * | 11/1986 | G06F/3/023 |
| JP | 01177629 | * | 7/1989 | G06F/3/023 |
| JP | 402090814 | * | 3/1990 | H03M/11/04 |

* cited by examiner

*Primary Examiner*—Bipin Shalwala
*Assistant Examiner*—Mansour M. Said
(74) *Attorney, Agent, or Firm*—Martin J. McKinley

(57) ABSTRACT

In a network computer system wherein the type of keyboard at a managing terminal is different from the type of keyboard at a managed terminal, keyboard scan code data from the keyboard at the managing terminal is first converted to virtual scan code data. Next, the virtual scan code data is converted to keyboard scan code data that is compatible with the keyboard at the managed terminal. This conversion, which uses two conversion tables that are selected from a plurality of conversion tables by detecting the different types of keyboards at the managing and managed terminals, permits the keyboard at the managing terminal to be of a different type than that at the managed terminal.

2 Claims, 5 Drawing Sheets

DATA CONVERSION METHOD USED BETWEEN DIFFERENT TYPES OF KEYBOARDS

BACKGROUND OF THE INVENTION

Applicants claim the benefits under 35 U.S.C. 119 of Japanese Patent Application 11-054043, which was filed Mar. 2, 1999. This Japanese Patent Application and its translation are incorporated into this Application by reference.

This invention pertains to computer systems and, more particularly, to a network computer system in which the format of the keyboard scan code data at a managing terminal is converted to another format compatible with the keyboard scan code data at a managed terminal.

A remote control technology, which provides the means for a specific workstation to control other workstation across the network is always supported in a system management product as a help desk function, which is one of the most important functions provided for system management.

By using this function, the network system administrator can, from his or her own workstation, effectively control another workstation connected to the network so as to:

monitor the display screen of the managed workstation;

remotely control the keyboard of the managed workstation; and remotely control the mouse of the managed workstation.

The network system administrator also can perform the help desk function, troubleshooting activities, and remote maintenance for a user at a distant workstation. At present, the main system management products which support such remote control systems are the Tivoli TME10, the IBM NetFinity, the Intel LANDesk, and the Microsoft System Management Server.

In a conventional remote control system, when implementing a remote control process for a keyboard, the scan codes produced by the keyboard at a managing workstation are transmitted unchanged to a managed workstation. A problem arises, however, when physical types or logical layouts of the keyboards at the workstations are different, and one or some of the scan codes produced by the two keyboards for specific characters differ. In this case, certain keys can not be used, or characters other than those entered at the managing workstation are input for an application processed at the managed workstation. This conventional problem will be encountered frequently in countries, especially Japan and South Korea, wherein Chinese characters (kanji) are used. Since in such countries many different kanji keyboards are available (in Japan especially, a number of different types of kanji keyboards are used, including those designed for the NEC PC98), in these nations it is highly probable that the keyboard types in use at a managing workstation and at a managed workstation will differ.

SystemView for OS/2, which is system management software by IBM, and Netfinity Server, which is the succeeding product, resolve the above problem by identifying the keyboard types, the code pages and the country codes in use at the managing and the managed workstations, and then converting the scan codes produced by the keyboard at the managing workstation into scan code of the keyboard at the managed workstation. That is, as is shown in FIG. 5, scan code group A for keyboard A at a managing workstation 51 is converted into scan code group B for keyboard B at a managed workstation 52, and the obtained scan code group B is transmitted by the managing workstation 51 to the managed workstation 52.

This method can be used to resolve the above conventional problem; however, the following problems remain:

one-to-one conversion of the keyboard A scan code group A to the keyboard B scan code group B is performed; program logic is used for conversion; and {N(N-1)/2} conversion logic sets are required to support N keyboard layouts (see FIG. 6).

In Europe, although essentially the same keyboard hardware is used, keyboards having different key tops, i.e., keyboards having different logical layouts, are used in almost every country, and the same problem as is described above has arisen. For example, if a managing workstation in France uses a French keyboard, and a managed workstation in Italy uses an Italian keyboard, which means the logical layouts of the two keyboards differ, for a specific character the two keyboards have a different scan code. In this case, some keys can not be used, or a character produced for an application at the managed workstation is not the character that is entered at the managing workstation.

The purpose of this invention is to provide a remote control operation using a keyboard so that the conversion of scan codes between different keyboards can be effectively supported.

SUMMARY OF THE INVENTION

To achieve the above object, according to the present invention, for a remote control technology which enables a managing terminal to control a managed terminal in a network environment, a method for the conversion of keyboard scan code data between different types of keyboards is employed when physical types or logical layouts of the keyboards at a managing workstation and at a managed workstation differ. In this case, first, real scan code generated by the keyboard of the managing workstation is converted into virtual scan code, and then, the virtual scan code is converted into real scan code of the keyboard of the managed workstation.

In this invention, a virtual scan code concept is introduced. Real scan code generated by the keyboard of a managing workstation is first converted into virtual scan code, and then, the virtual scan code is converted into real scan code of the keyboard of the managed workstation. Since real scan code is temporarily converted into virtual scan code, which constitutes a unique intermediate code, an increase in the number of conversion logic sets, which increases as the number of supported keyboard types increases, can be minimized.

As a preferable style of this invention, a conversion table is used for the conversion between real scan code and virtual scan code. In this case, N keyboard types can be supported by using N conversion tables. Using a conversion table, a new keyboard type can be supported without changing the program logic. As another preferable style, a conversion table is constituted by an index portion and a conversion table portion. In this case, processing speed can be increased when implementing this invention.

DESCRIPTION OF THE ILLUSTRATIVE EMBODIMENTS

Figure 1:
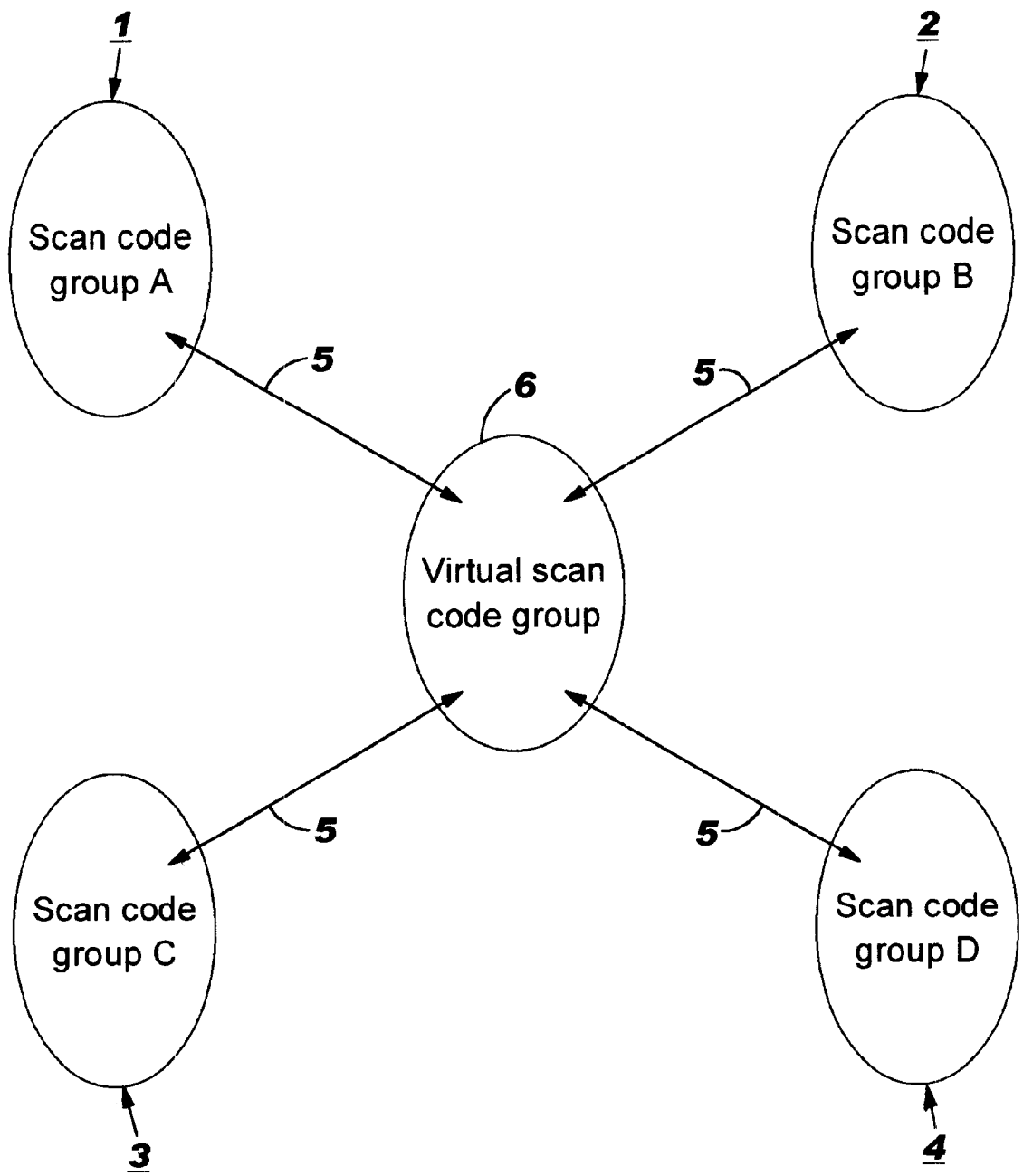
FIG. 1 is a diagram illustrating the concept of a method provided by this invention to convert scan code data between different types of keyboards.

FIG. 1 shows the concept of the method of this invention for data conversion between different types of keyboards. In FIG. 1, there is a managing workstation 1 with a keyboard A for scan code group A, and there are three managed workstations 2, 3 and 4, which have a keyboard B for scan code group B, a keyboard C for scan code group C, and a keyboard D for scan code group D, respectively. The keyboards A to D, provided for the managing workstation 1 and the managed workstations 2, 3 and 4, differ from each other in their physical types or in their logical layouts, and the scan code groups A to D also differ from each other. The managing workstation 1 is connected to the managed workstations 2, 3 and 4 across a network 5. The managing workstation 1 can remotely control the managed workstations 2, 3 and 4.

With this assumption, the feature of this invention is that real scan code (scan code in scan code group A) generated by keyboard A at the managing workstation 1 is temporarily converted into virtual scan code of a virtual scan code group 6, and then the virtual scan code is converted into real scan code (scan code in scan code groups B, C and D) of keyboards B, C and D at the managed workstations 2, 3 and 4, respectively. This conversion can be performed by providing for each physical keyboard or logical keyboard a conversion table describing the relation between real scan code and virtual scan code. A detailed explanation of the conversion table will be given later.

In the situation described in FIG. 1, data conversion using a conversion table introduced by this invention works as follows:

1) detecting, when a remote control session starts, physical types or logical layouts of the keyboards at the managing workstation and at the managed workstations, and specifying conversion tables;

2) loading, into a memory area, the conversion tables of the keyboards at the managing workstation and at the managed workstations, and preparing for data conversion;

3) receiving real scan code for a character input from the keyboard at the managing workstation;

4) converting the real scan code into virtual scan code by referring to the conversion table provided for the keyboard at the managing workstation;

5) converting the virtual scan code into real scan code by referring to the conversion table of the keyboard at the managed workstation;

6) transmitting the real scan code to the managed workstation; and 7) repeating the processes 3) to 6) until the session is terminated.

Figure 2:
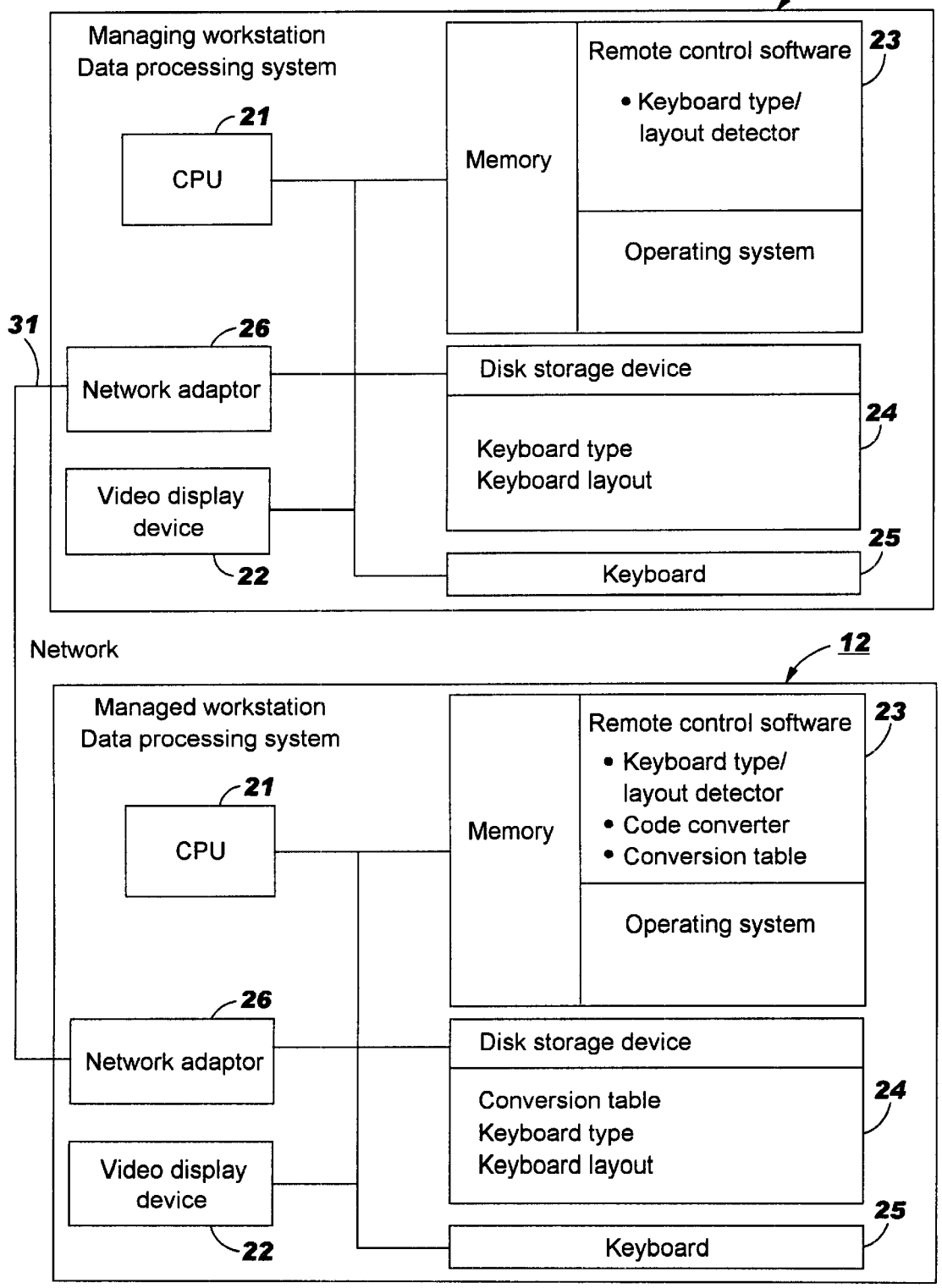
FIG. 2 is a block diagram illustrating the data processing systems at a managing workstation and at a managed workstation that are used to implement this invention.

FIG. 2 is a block diagram showing the data processing systems for implementing this invention for a managing workstation and a managed workstation. In the example in FIG. 2, included in both a managing workstation 11 and a managed workstation 12 are a CPU 21, a video display device 22, a memory 23, a disk storage device 24, a keyboard 25 and a network adapter 26. The managing workstation 11 and the managed workstation 12 are connected together across a network 31 by the network adapters 26. Before a remote control session using this invention starts, the conversion tables and necessary data, such as keyboard types and keyboard layouts, are stored in the disk storage devices 24 of the respective workstations.

When the session starts, first, keyboard types and keyboard layouts stored in the disk storage devices 24 are used to specify the conversion tables. Not only the conversion table specified for the managed workstation 12 but also the conversion table specified for the managing workstation 11 is loaded and executed, together with code converters, into the memory 23 of the managed workstation 12. Since two conversion tables used for code conversion are stored, loaded and used only by the managed workstation 12, even when the number of the workstations 12 for which remote control is provided is increased, each managed workstation 12 need only load into the memory 23 its own conversion table and the conversion table of the managing workstation 11. As a result, the memory 23 need not have a large capacity.

Figure 3:
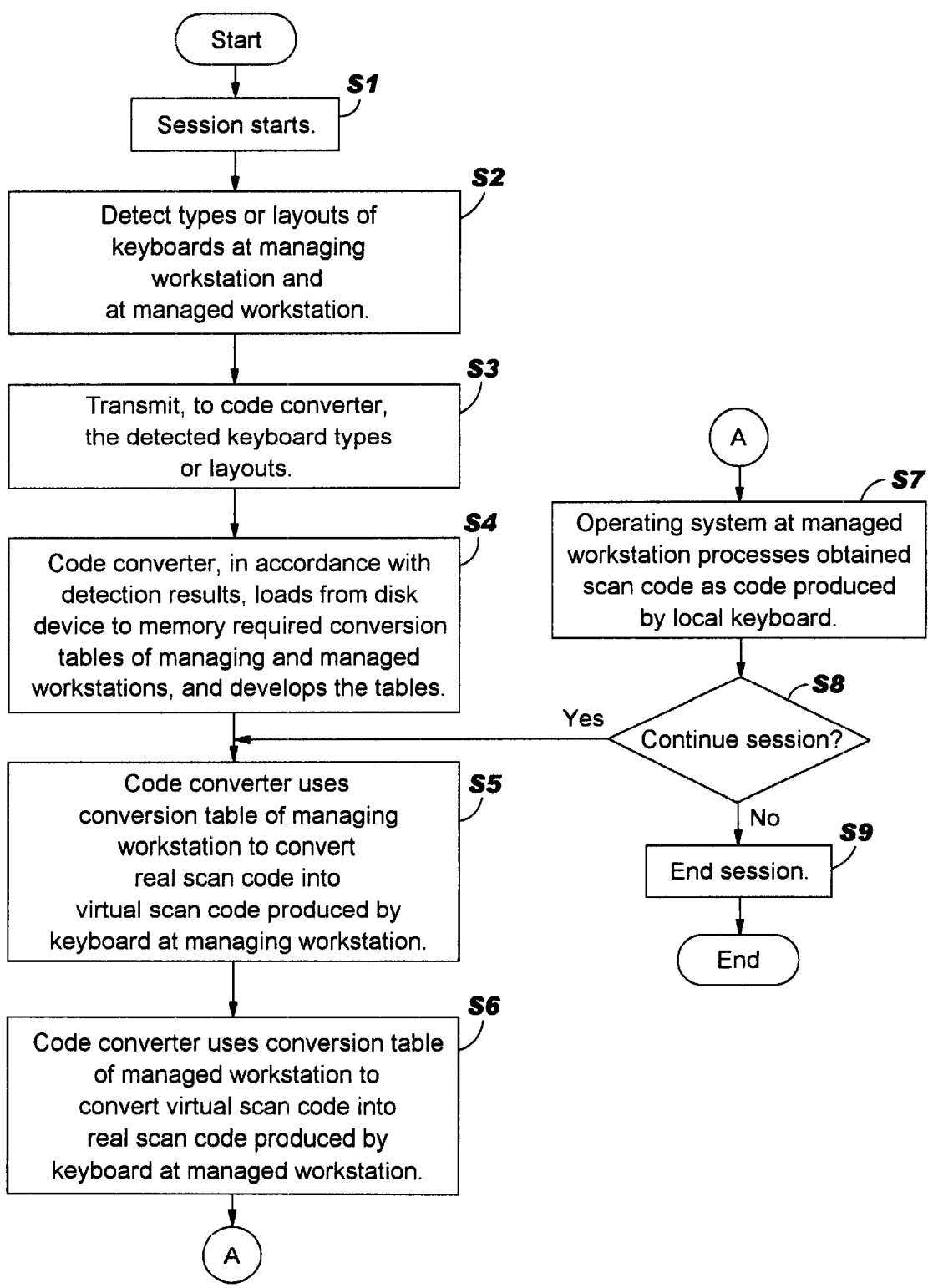
FIG. 3 is a flowchart for explaining the method of this invention to convert scan code data between different types of keyboards.

FIG. 3 is a flowchart for explaining the method of this invention for the data conversion for different types of keyboards. An explanation will be given while referring to FIG. 3, even with slight overlaps of the previous description. First, when a remote control session starts (step S1), keyboard types or keyboard layouts of the managing workstation and the managed workstation are detected (step S2). Then, identities of the thus detected keyboard types or keyboard layouts are transmitted to the code converter of the managed workstation (step S3). And in accordance with the received results, the code converter loads into memory the corresponding conversion tables stored on the disk device and develops them (step S4).

Subsequently, the code converter uses the conversion table of the managing workstation to convert real scan code, generated by the keyboard at the managing workstation, and to obtain virtual scan code (step S5). Following this, the code converter uses the conversion table of the managed workstation to convert the virtual scan code and to obtain real scan code of the keyboard at the managed workstation (step S6). The thus obtained real scan code is processed by an operating system and is used as keyboard input performed at the managed workstation (step S7). A check is then performed to determine whether the session should be continued (step S8). When the session is not to be continued, it is terminated (step S9). When the session is to be continued, program control returns to step S5, and repeats steps S5 to S8.

The actual means used to detect a keyboard type or a keyboard layout is, for example, 1. for Microsoft Windows (TM),
    GetKeyboardLayoutName
    GetKeyboardType
2. for OS/2 (TM),
    Generic lOCtl (7BH: Query Keyboard Code Page Information)
    Generic lOCtl (77H: Get KBD ID, Category 4)

Figure 4A:
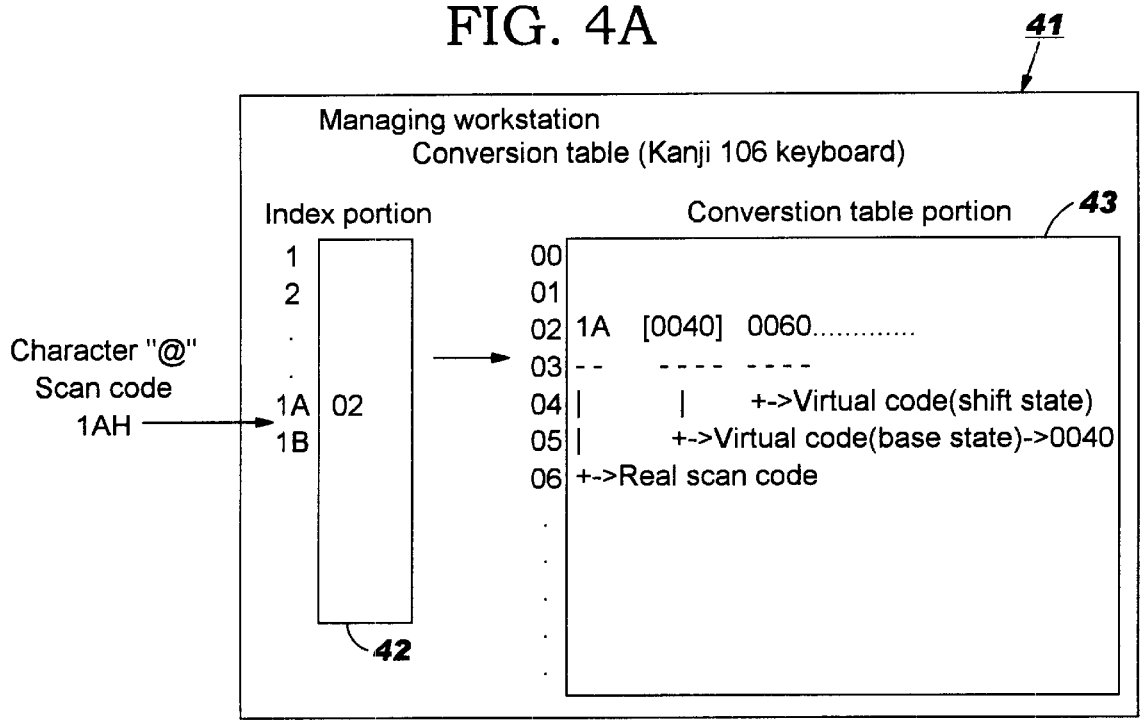
FIGS. 4(a) and 4(b) are diagrams showing conversion tables used in this invention for a managing workstation and for a managed workstation.
Figure 4B:
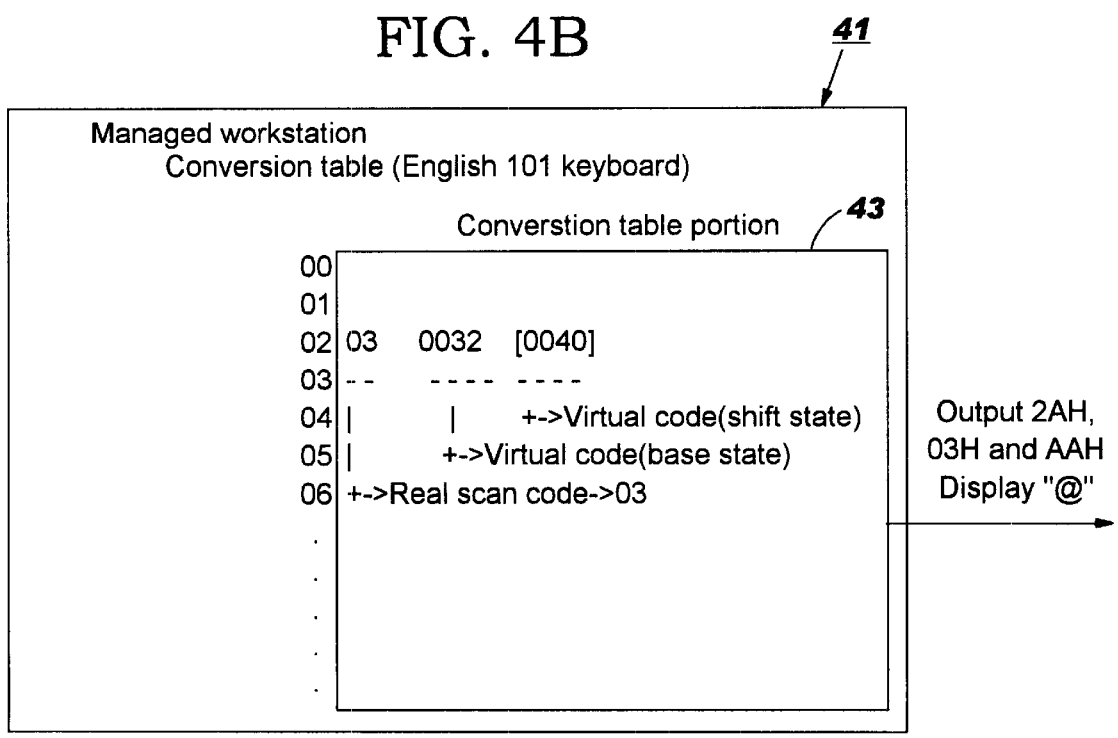
Figure 5:
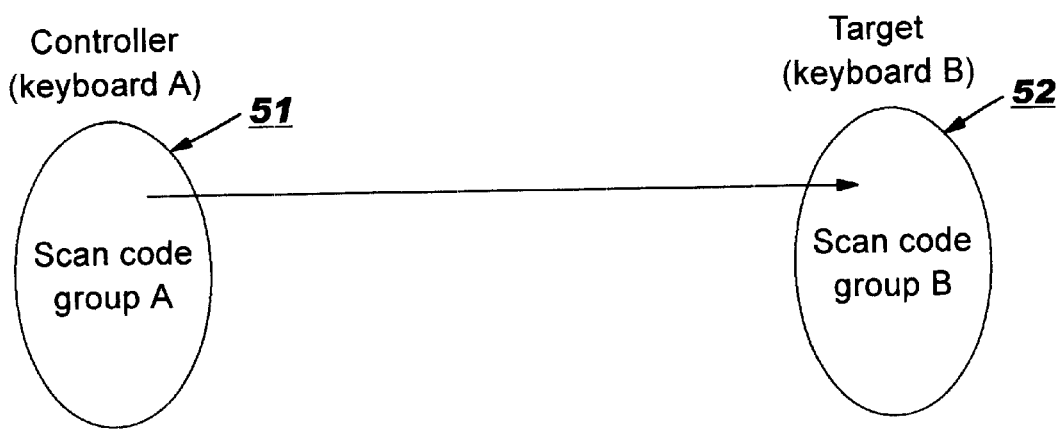
FIG. 5 is a diagram for explaining a conventional remote control process.
Figure 6:
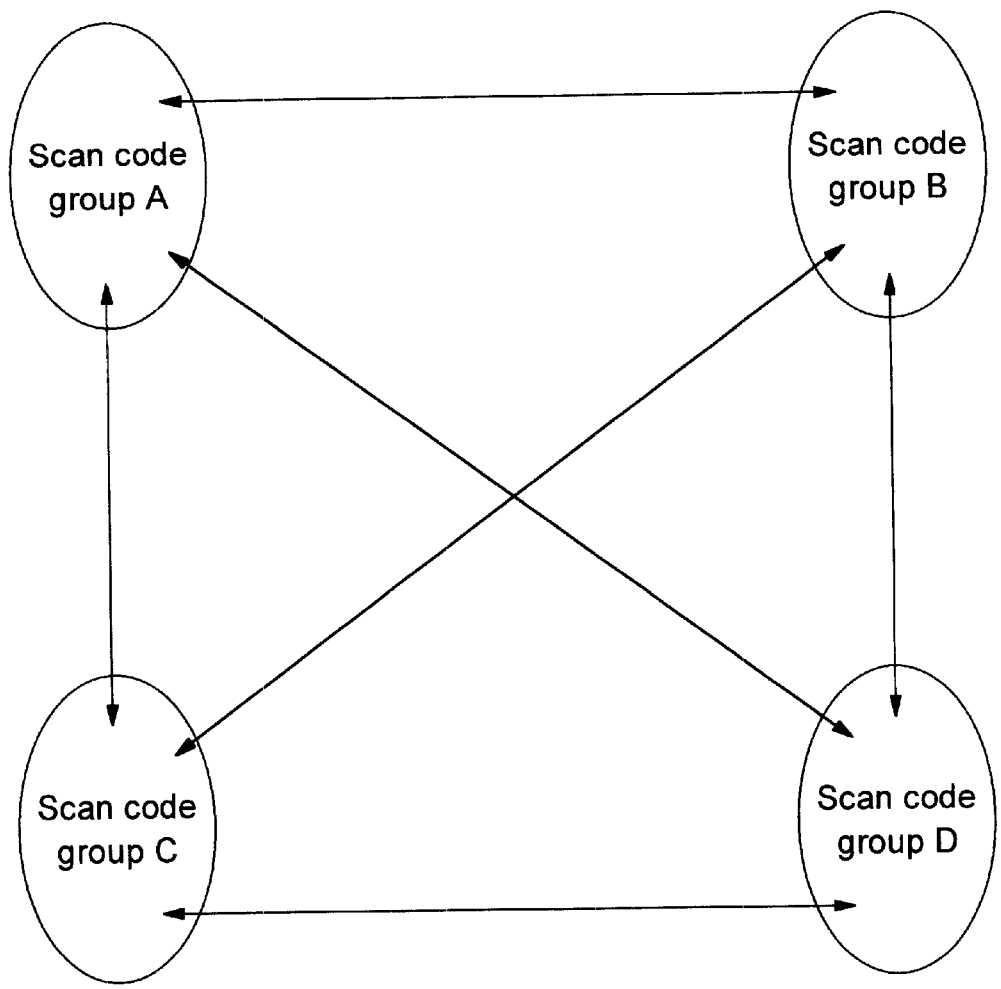
FIG. 6 is a diagram for explaining the necessary number of conversion logic sets required for the conventional remote

FIGS. 4(a) and 4(b) are diagrams showing conversion tables used in this invention for a managing workstation and a managed workstation. In FIGS. 4(a) and 4(b), a conversion table 41 includes an index portion 42 and a conversion table portion 43. In the index portion 42, the relationship between an input real scan code and the index of the conversion table 43 is shown. This index portion 42 maps the real scan code data which correspond to the frequently used characters at the upper address, which achieves a higher speed of conversion when implementing this invention. Each indexed entry of the conversion table portion 43 has the defined rows which represent real scan code, the virtual scan code of the base state (made without the shift key being pressed), the virtual scan code of the shift state (made with the shift key being pressed) and virtual scan code of the Alt state (made with the Alt key being pressed), as needed. Although for the convenience of the explanation the index portion 42 is not shown in the example in FIG. 4(*b*), it can be included in the conversion table 41, as needed.

The scan code conversion processing will now be described while referring to FIGS. 4(*a*) and (*b*). Assume that the keyboard at the managing workstation is a kanji 106 keyboard, and the keyboard at the managed workstation is an English 101 keyboard, and that "@" (a scan code of '1A'H) is entered at the managing workstation. In this case, the scan code conversion processing is performed as follows.

1) In the conversion table 41 of the managing workstation the code converter searches through the index portion 42 for the scan code '1A'H and gets the index number '02'H of the conversion table 43 (FIG. 4(*a*)).

2) Thereafter, at the location in the conversion table portion 43 pointed to by the index number '02'H, the code converter gets the virtual scan code that is stored there, i.e., in this case, because the ON/OFF control code of the shift state has not been considered, virtual scan code '0040'H, in the base state.

3) Then, in the conversion table 41 of the managed workstation, the code converter searches through the conversion table portion 43 (FIG. 4(*b*)) for the virtual scan code '0040'H, and gets the corresponding real scan code '03'H and the necessary shift state from the row in which the virtual scan code was found. As a result, it is determined that the real scan code '03'H must be output while the keyboard of the managed workstation is in the shift state.

4) In accordance with the obtained results, the code converter outputs '2A'H (the real scan code in the shift-ON state), '03'H, and 'AA'H (the real scan code in the shift-OFF state).

5) "@" is displayed at the managed workstation.

When the same kind of keyboards are in use at a managing workstation and at a managed workstation, naturally enough, this invention can be applied to them, although this is not the subject of this invention. Further, when it is ascertained that the same kind of keyboards are in use at the managing workstation and at the managed workstation, real scan code can be transmitted directly, instead of the conversion table being used.

As is apparent from the above description, this invention introduces the concept of virtual scan code. Specifically, real scan code generated by the keyboard at a managing workstation is converted into virtual scan code, and then, the virtual scan code is converted into real scan code of the keyboard at a managed workstation. Therefore, since real scan code is converted into virtual scan code, which serves as a unique intermediate code, it is possible to minimize the increase in the number of conversion logic sets required to support different types of keyboards as the number of supported keyboard types increases.

When the conversion tables are used for the conversion between real scan code and virtual scan code, N keyboard types can be supported by N conversion tables. In addition, when the conversion tables are used, a new type of keyboard can be supported without a program logic change. control process.

We claim as our invention:

1. A method for the conversion of keyboard scan code data, the method for use in a network having a managing terminal and a managed terminal, the method comprising the steps of:

a) converting first real scan code data generated by a keyboard at the managing terminal into virtual scan code data;

b) converting the virtual scan code into second real scan code data for use at the keyboard of the managed terminal;

c) detecting the type of keyboard at the managing terminal and the type of keyboard at the managed terminal;

d) selecting a first conversion table from a plurality of conversion tables, the first conversion table corresponding to the keyboard at the managing terminal;

e) selecting a second conversion table from the plurality of conversion tables, the second conversion table corresponding to the keyboard at the managed terminal;

f) loading the first and second conversion tables into a memory;

g) using the first conversion table to convert the first real scan code data into the virtual scan code data;

h) using the second conversion table to convert the virtual scan code data into the second real scan code data; and i) transmitting the second real scan code data to the managed terminal.

2. The method according to claim 1, wherein the first and second conversion tables each include an index portion and a conversion portion.

\* \* \* \* \*